United States Patent [19]

Rosso et al.

[11] Patent Number: 5,070,774
[45] Date of Patent: Dec. 10, 1991

[54] MACHINE FOR THE RAPID AND AUTOMATIC COOKING OF FOODSTUFFS, PARTICULARLY PASTA

[75] Inventors: Antonio V. Rosso, Cavinago; Giuseppe Dovile, via Appiani 42, 31100 Treviso, both of Italy

[73] Assignee: Giuseppe Dovile, Treviso, Italy

[21] Appl. No.: 689,186

[22] Filed: Apr. 22, 1991

Related U.S. Application Data

[63] Continuation-in-part of Ser. No. 564,415, Aug. 8, 1990, abandoned.

[51] Int. Cl.[5] .................. A47J 27/04; A47J 27/16; A47J 27/21; A47J 37/12
[52] U.S. Cl. ............................. 99/330; 99/339; 99/355; 99/403; 99/407
[58] Field of Search ................ 99/330, 331, 332, 352, 99/355, 359, 339, 360, 403, 404, 407, 410; 426/509, 510

[56] References Cited

U.S. PATENT DOCUMENTS

| | | | |
|---|---|---|---|
| 4,543,878 | 10/1985 | Luchetti | 99/407 |
| 4,732,080 | 3/1988 | Vita | 99/330 |
| 4,803,916 | 2/1989 | Tacconi | 99/355 |
| 4,803,917 | 2/1989 | Barbieri | 99/410 |
| 4,821,632 | 4/1989 | Bolzani et al. | 426/509 |
| 4,856,422 | 8/1989 | Meister | 99/330 |
| 4,869,160 | 9/1989 | Pratolongo | 99/403 |
| 4,901,632 | 2/1990 | Lori | 99/409 |
| 4,934,259 | 6/1990 | Watanabe | 99/339 |
| 4,945,826 | 8/1990 | Ripatonda | 99/403 |
| 4,968,516 | 11/1990 | Thompson | 426/510 |

FOREIGN PATENT DOCUMENTS

8000507 8/1980 Netherlands ................ 99/407

*Primary Examiner*—Timothy F. Simone
*Attorney, Agent, or Firm*—Robert Louis Finkel

[57] ABSTRACT

A monolithic upper section contains a boiler surrounding an initial cooking chamber. A lower section contains a final cooking chamber aligned vertically with the upper chamber. Superheated water is piped from the boiler into the upper chamber. Valve controlled piping transfers steam from the upper chamber to the lower chamber and discharges steam and cooking water from the lower chamber, to maintain predetermined temperature and pressure levels within the two chambers. Ball valves in the lower ends of the two chambers allow the partially cooked product and cooking water to drop from the upper chamber into the lower chamber, and the drained fully cooked product to drop from the lower chamber onto a serving plate.

8 Claims, 3 Drawing Sheets

MACHINE FOR THE RAPID AND AUTOMATIC COOKING OF FOODSTUFFS, PARTICULARLY PASTA

This is a continuation-in-part of copending application Ser. No. 07/564,415 filed on Aug. 8, 1990 and now abandoned.

BACKGROUND

1. Field of the Invention

The present invention relates to devices for the cooking of foodstuffs, and more particularly to a machine for the rapid and automatic cooking of pasta.

2. Prior Art

Known machines of this type comprise an initial cooking chamber in which the pasta placed therein is processed with water or hot pressurized steam, and a second chamber in which the pasta product is placed after completion of the first cooking stage. Most of these machines are complicated affairs, very expensive to manufacture, and even more costly to maintain. With few exceptions, their performance is unpredictable and leaves a great deal to be desired. By and large, they are too undependable and impracticable for commercial use.

A particularly troublesome source of difficulty with virtually all of the prior art automatic pasta cooking machines is the transfer of the partially processed product from the first to the second chamber. This is generally accomplished either by using a stream of steam or water to flush the product from the first chamber into the second chamber, or by effectively causing a drop in pressure between the first and second chambers, thereby forcibly expelling the product from the first chamber into the second chamber.

In devices of the first type, flushing the soft, partially cooked pasta from the first to the second chamber by means of a jet of steam or water requires a substantial quantity of steam or pre-heated water, most of which is wasted, and tends to damage the product and cause it to stick to the chamber walls. Reducing the force of the jet or stream to protect the product results in some of the product not being transferred and remaining in the first chamber or in the passageway between the two chambers. Devices of the second type, while partially recovering the steam or water extracted from the first chamber, sometimes fail to completely transfer the product into the second chamber because it tends to adhere to the bottom and sides of the first chamber and the intervening passageway.

An object of the present invention is to provide a machine for the rapid and automatic cooking of pasta which avoids these and other deficiencies and problems posed by known machines.

Another object is to provide a machine of this type which can be fabricated at relatively low cost and which requires a minimum of maintenance.

Another object is to provide a machine which is dependable and practicable for commercial use in the fast-food industry.

Still another object is to provide an automatic cooking machine for such foodstuffs as pasta, wherein the cooking is carried out in at least two stages in separate cooking chambers, using water superheated in a boiler contained within the machine.

A further object is to provide a machine wherein for ease of manufacture and maintenance the boiler and at least one of the cooking chambers are formed as a monolithic unit.

Yet another object is to provide such a machine in which the several cooking chambers are aligned vertically, thereby allowing the product being processed to move from chamber to chamber successively solely under the influence of gravity.

A still further object is to provide an automatic cooking machine of the type described which is simple to operate and requires little, if any, human skill, training, or intervention to produce the desired product reliably and repeatably.

BRIEF SUMMARY

These objects, and others which will become apparent from the following description, are achieved by the provision of a machine for the rapid and automatic cooking of a foodstuff, such as pasta, comprising a first initial cooking chamber and a second final cooking chamber. The two chambers are coaxially aligned along a vertical axis. The initial cooking chamber is formed inside a boiler and has an inlet at its that abuts a dispenser of the aforesaid product, and an outlet at its lower end that abuts an inlet at the top of the second cooking chamber. The second cooking chamber is also provided at its lower end with an outlet from the machine. Leakproof stop valve means positioned at the inlet of the first chamber and the outlet of the second chamber, and between the outlet of the first chamber and the adjoining inlet of the second chamber allow the food product to be introduced into the initial cooking chamber, transferred from that chamber to the final cooking chamber and discharged from the machine all solely under the influence of gravity. Piping connecting the boiler with the first chamber, the first cooking chamber with the second cooking chamber, and the second chamber with a discharge drain, each fitted with at least one valve means capable of being selectively controlled, allow superheated water from the boiler to be admitted into the first cooking chamber, and water and steam to be transferred to the second chamber and ultimately, discharged.

Sensors in the chambers monitor temperature and pressure and control the piping valves to regulate the conditions within the chambers.

Preferably, one end of the piping connecting the two chambers enters the second chamber to meet a portion of the wall where a second piping is hooked up to drain the water contained in the second chamber, and which may be connected for drainage purposes through corresponding valve means.

For a fuller understanding of the structural and functional characteristics and the advantages of a machine according to the present invention, reference should be made to the following illustrative and non-restrictive description taken in connection with the accompanying drawings, in which:

DRAWINGS

FIG. 1 is an elevational view, with parts broken away, of a preferred first embodiment of a machine for the rapid and automatic cooking of pasta, FIG. 2 is an elevational view, also with parts broken away, of a second embodiment of a machine according to the invention, and FIG. 3 is a detail, with parts broken away, depicting a preferred valve means for interconnecting the various components of the aforesaid machines.

DETAILED DESCRIPTION

Figure 1:
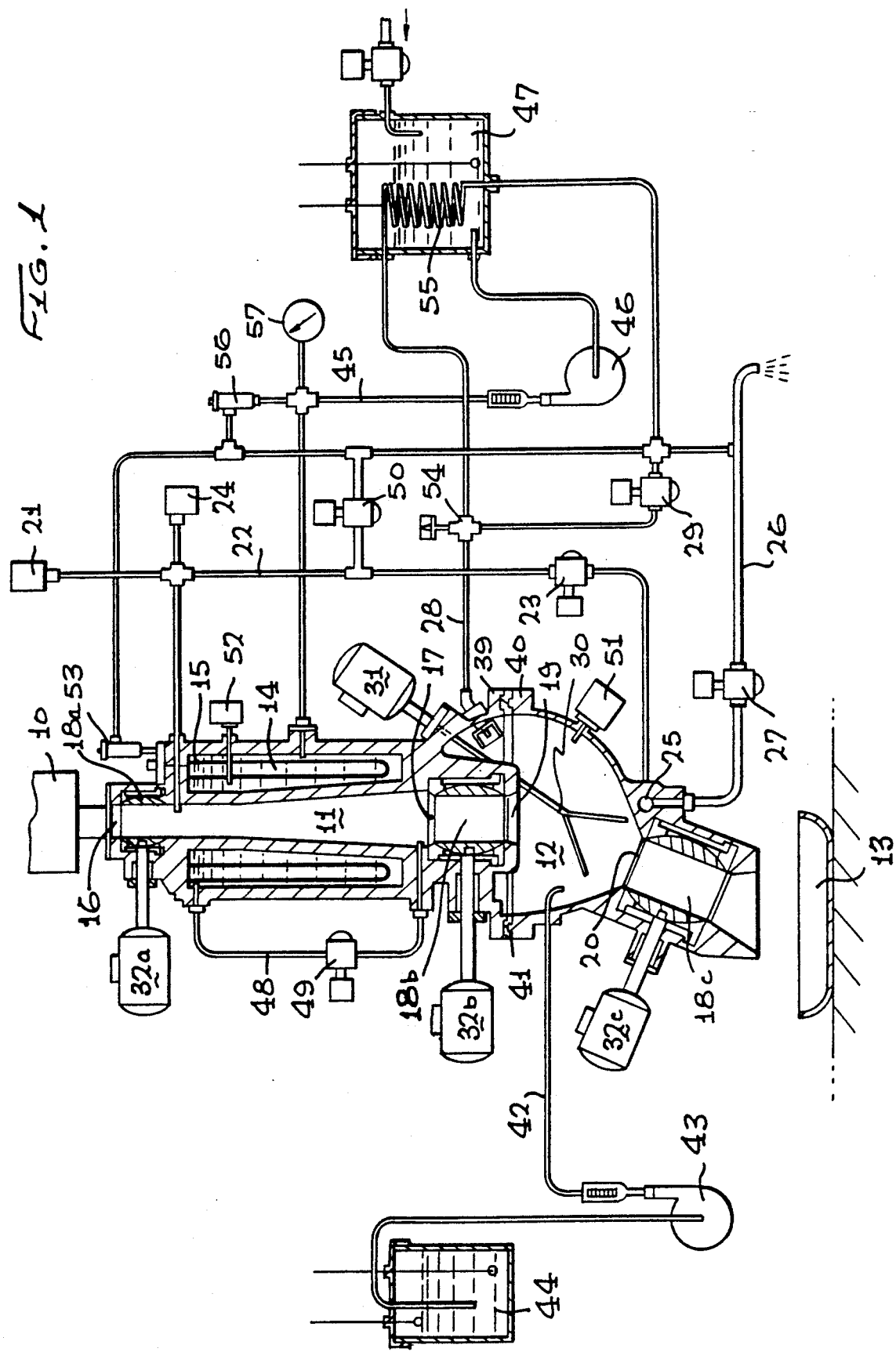

Referring to FIG. 1, a machine in accordance with the subject invention for the rapid and automatic cooking of foodstuffs, particularly pasta, it will be seen that the preferred embodiment comprises an initial pre-cooking chamber 11, and a second chamber 12, in which final cooking takes place before the pasta is deposited or allowed to drop into an underlying container, such as a plate 13. In the apparatus illustrated, a predetermined amount of pasta is fed into the machine by a dispensing device 10 located above the chamber 11. The construction and operation of the dispenser 10, per se, form no part of the subject invention.

The first cooking chamber 11 is arranged axially upright inside a boiler 14. Heating means, such as resistors 15 within or associated with boiler 14, heat water contained in the boiler to a desired elevated temperature, preferably in the range of 190° to 215° F.

In the preferred embodiment, the boiler 14 and the first cooking chamber 11 are formed of one piece, for example of cast aluminum. The cooking chamber 11 is comprised of a substantially cylindrical inlet portion 16 encountering a truncated conical portion which broadens as it approaches an outlet 17 in its lower end. Abutting the inlet 16 and outlet 17 of the first cooking chamber 11 are leakproof stop valve means 18a and 18b, respectively, comprising, for example, ball valves such as the valve 18 shown in FIG. 3. The construction and operation of these valves will be described in detail shortly.

Figure 3:
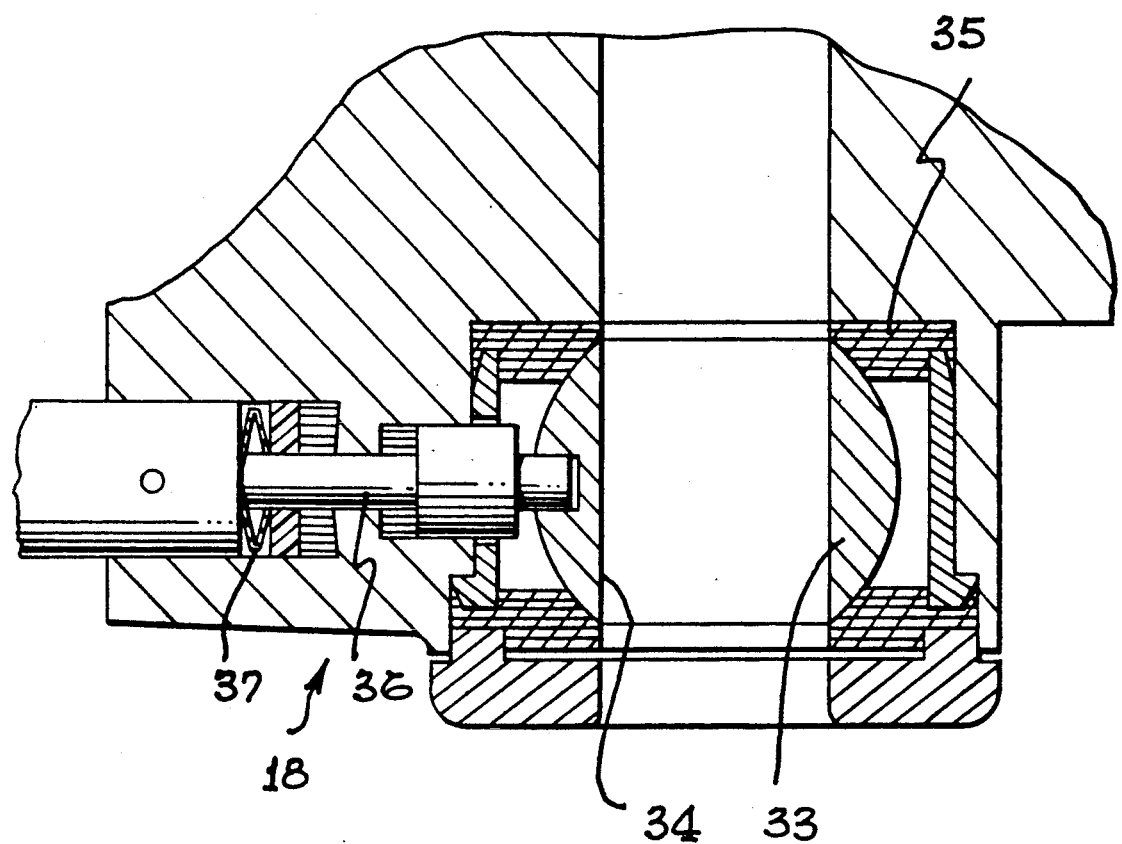

In the embodiment shown in FIG. 1, the second cooking chamber 12 is located below the pre-cooking chamber 11 and is fitted with an inlet 19 and a corresponding outlet 20. The inlet 19 is substantially flush with the first chamber 11, while the lower outlet 20 is slanted and displaced laterally of the second chamber 12. Further leakproof stop valve means 18b of the type shown in FIG. 3 are placed between the outlet 17 of the first chamber and the inlet 19 of the second chamber 12.

The second chamber 12 is of a generally truncated conical shape with a larger upper circular base corresponding and connected to the first chamber 11, and a smaller lower base whose axis is on a slant, as indicated.

Piping 22 is provided for interconnecting the first and second chamber and is equipped with at least one valve means 23 capable of selectively controlling the connection or separation of the cooking chambers 11, 12 to vary their internal pressure. Valve means 23 is controlled by a pressure-responsive cut-off switch 24 operatively connected to sense the pressure in piping 22 and appropriately adjusted according to the cooking process to be effected.

Next to the outlet 20 in the lower wall of the body of the second chamber 12 is a conventional drainage outlet 25, comprising, for example, a plurality of small channels (not shown in detail). Outlet 25 is operationally connected to a drainage pipe 26 for draining water contained in the second chamber 12 by way of valve means 27. Preferably, the lower end of the first piping 22, connected to the second cooking chamber 12, also abuts the drainage outlet 25.

Drainage piping 28 is connected to the upper wall of the second chamber 12. Valves 54 and 29 allow piping 28 to be connected to the drainage pipe 26. Further features and functions of pipe 28 will be explained presently.

Inside the second chamber 12, a mixing element, such as a contoured rod 30, is introduced from above and driven by conventional powered means adapted to assist with the final cooking of the product and prevent the obstruction of the outlet 25 by the product.

The leakproof stop valve means 18a-18c are operated by conventional powered driving means 32. In this embodiment direct-drive electric motors are illustrated, but it will be understood that pneumatic, hydraulic or any other suitable type of actuator may be employed.

FIG. 3 illustrates a typical embodiment of the leakproof stop valve means 18a-18c connecting the various parts of the machine according to the invention.

Ball valve 18 includes a central core 33 with an intermediate cylindrical portion equipped with further portions having semispherical ends adapted to facilitate the rotation of the valves. In the aforesaid intermediate cylindrical portion, a clearance hole 34 permits communication between the machine parts, among which is interposed the aforesaid valve. The semispherical ends of the valves rotate above the appropriately-shaped gaskets 35, adapted to prevent leakage. At one of the two semispherical surfaces of the central core 33, a stem 36 extends which is also equipped with elastic elements 37 adapted to ensure a perfect fit with the actuating means 32.

Figure 2:
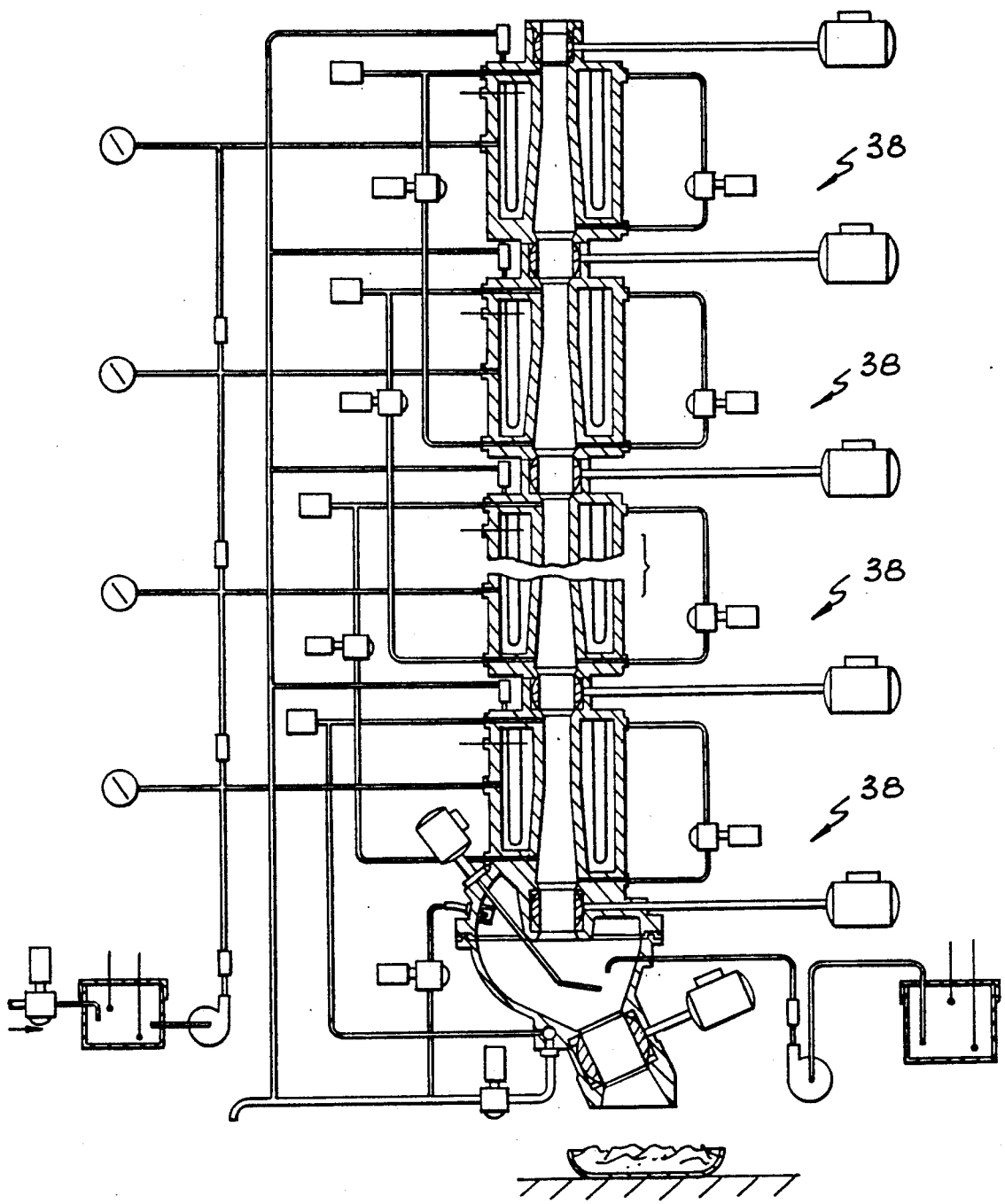

FIG. 2 shows a second alternate embodiment of the machine related in this invention, whereby the first chamber 11 comprises a plurality of sub-chambers, each one depicted entirely at 38, which are arranged sequentially and are in every way similar to the first chamber described above. The arrangement of the plurality of sub-chambers accelerates the time required for pre-cooking the foodstuffs introduced into the machine, so that a final, usable product may be obtained within a couple of seconds.

In the preferred embodiment of the present invention illustrated in FIG. 1, the first chamber 11 is molded or cast as a hollow monolithic piece, the lower portion of which provides a seat for one of the leakproof stop valve means 18a-18c, or holes through which either the piping 28 or mixing element 30 can be inserted into the second chamber. A seat on a lower rim 40, and another on a complementary upper rim 39 facing the second chamber 12, are fitted with a gasket 41 made of an insulating material capable of acting as a thermal barrier between the aforesaid chambers, which must be operated at different temperatures.

Chamber 12 is connected through piping 42 and pump 43 to tank 44 containing water containing salt and other seasonings, or the like. This arrangement makes it possible to season the pasta during the final cooking stage in chamber 12.

Further piping 45 is provided for filling the boiler 14 with water drawn from tank 47 by means of pump 46.

Heated water is moved from inside the boiler 14 to the first cooking chamber 11 by means of piping 48 equipped with a corresponding valve means 49 which is controlled on the basis of operating needs. In the interest of safety, an electrically operated relief valve 50 provides an outlet for pressure in chamber 11 by allowing piping 22 to be connected to drainage line 58. Additionally, pressure valves 53, 56, draining through line 58 and pipe 26, protect boiler 14 and discharge line 58 from the buildup of potentially dangerous overpressure.

A machine for the rapid and automatic cooking of a foodstuff as described above operates in the following manner.

On initiation of the cooking cycle, pressure switch 21 opens to discharge any residual pressure in chamber 11. Valve means 18a is then moved to its open position by motor-drive 32a. Dispenser 10 determines the correct batch size and discharges that amount of pasta into inlet 16 of chamber 11. At this point, the valve 18a is closed and electric valve means 49 is opened, allowing boiling hot or superheated water contained in the boiler 14 to enter chamber 11.

As water flows from boiler 14, it is replaced by an equal volume of water drawn from the tank 47 by the pump 46. This operation is controlled and tracked by the preprogrammed pressure-operated cut-off switch 24. When a predetermined pressure or water level is reached in chamber 11, valve 49 is closed.

The product in chamber 11 is immersed in water and steam at a temperature of about 266°-356° F. and a pressure of about 6-16 bars for a predetermined time. The upright orientation of chamber 11 insures that the product is cooked uniformly.

At the end of the pre-cooking period, electric valve 23 opens, allowing steam and a small amount of water to flow from chamber 11 through piping 22 and outlet 25 into chamber 12, thereby lowering the pressure in chamber 11 by about one-half. The steam and hot water from chamber 11 discharged from pipe 22 through outlet 25 serve to keep the outlet free of any pasta or debris which may have been deposited on the bottom of chamber 12 during a previous cooking cycle. A portion of the steam entering chamber 12 leaves chamber 12 through pipe 28 and passes through coil 55 in tank 47, thereby heating the water contained in tank 47 through thermal exchange. The condensate from the steam in coil 55 leaves the system through drainage pipe 26. Through this stage of the cycle, the partially cooked product remains in chamber 11.

As soon as the pressure in chamber 11 and 12 are roughly equal, as gauged by the pressure-operated cut-off switch 24, ball valve 18b is opened by actuating means 32b and the entire mass of partially cooked pasta, together with the hot water in which it has been cooking, drops freely under the influence of gravity into chamber 12. At this point valves 18b, 23 and 27 are programmed to move to their closed positions, retaining the partially cooked pasta and a substantial quantity of still hot water in chamber 12 for the final cooking phase. If desired, a new batch of the product may now be introduced into the first chamber for pre-cooking.

The product remains in chamber 12 for a previously established period. The speed at which the steam exits through drainage pipe 28 is determined by the design and characteristics of coil 55. Preferably the flow rate is kept low, in order to minimize the cooking period. In the event the temperature in chamber 12, as sensed by temperature sensor 51, is greater than about 230° F., to prevent overheating in chamber 12, electric valve 29 is automatically activated so that the steam exiting through pipe 28 is shunted to the direct quick drain controlled by electric valve 29 and out of the system through pipe 26. Check valve 54 insures that neither steam nor water can return to chamber 12. At the same time, electric valve 50 opens, allowing any residual pressure in chamber 11 to dissipate. In this manner, the machine is made ready to accept another portion of pasta with the opening of valve 18a the water contained therein is caused to circulate through the piping 26 by the valve means 27.

During the final cooking stage, the mixing element 30 is activated to enhance processing of the product and salted water may be introduced, if desired, through the piping 42. Meanwhile, excess steam continues to drain through pipe 28. When the preset cooking time has passed, electric valve 27 opens and allows the water to drain through outlet 25 and discharge pipe 26. The ball valve 18c at the outlet 20 is now driven to open, and the cooked product is allowed to drop onto the plate 13, ready to serve.

In the embodiment shown in FIG. 2, providing an initial chamber 11 comprising a plurality of sub-chambers 38, a series of very brief pre-cooking stages shorten the product's total cooking time. In fact, the cooking time is inversely proportionate to the time spent in the cooking chambers or sub-chambers provided. The slanted outlet in the lower end of the second chamber facilitates the complete discharge of the cooked product and at the same time places the outlet 25 in the optimum position for discharging the cooking water contained in the second chamber.

Although the present invention has been described in detail with reference to particular embodiments, persons possessing ordinary skill in the art to which it pertains will appreciate that various other modifications and enhancements may be made without departing from the spirit and scope of the claims that follow.

We claim:

1. A machine for the rapid and automatic cooking of foodstuffs, such as pasta, comprising:
   a monolithic upper portion comprising an elongated generally upright first cooking chamber, said first cooking chamber having an inlet in its upper end and an outlet in its lower end, and a boiler, said boiler substantially surrounding said first cooking chamber and containing heating means for superheating water therein;
   a lower portion containing a second cooking chamber, said second cooking chamber having an inlet in its upper end in registration and vertical alignment with the outlet of the first chamber, and an outlet in its lower end;
   first valve means associated with and selectively opening or sealing the inlet of said first cooking chamber;
   second valve means interposed between the outlet of said first cooking chamber and the inlet of said second cooking chamber and selectively opening or sealing said outlet and inlet;
   third valve means associated with and selectively opening or sealing the outlet of said second cooking chamber;
   first piping connected between said boiler and said first cooking chamber and including valve means, controllably transferring superheated water from said boiler to said first cooking chamber;
   second piping connected between said first cooking chamber and said second cooking chamber and including valve means, controllably transferring steam from said first cooking chamber to said second cooking chamber;
   drainage means connected to the lower end of said second cooking chamber and including valve means, controllably draining water from said second cooking chamber; and
   third piping connected between said second cooking chamber and said drainage means and including valve means, controllably discharging steam from said second cooking chamber.

2. A machine as defined in claim 1, comprising:

temperature and pressure sensors positioned to sense the temperature and pressure within said first and second cooking chambers;

control means effectively controlling the valve means in said first, second and third piping and in said drainage means in response to the output of said temperature and pressure sensors, whereby the temperature and pressure within said first and second cooking chambers can be closely regulated.

3. A machine as defined in claim 2, comprising:

opposing rims on said upper and lower portions of the machine, said rims having gasket-receiving seats; and a gasket of thermal insulating material positioned in said seats and defining a thermal barrier between the boiler and first cooking chamber and the second cooking chamber.

4. A machine as defined in claim 2, comprising:

the lower end of the second cooking chamber being displaced laterally of the machine's vertical axis; and the drainage means being connected to the lower end of said second cooking chamber at the lowest point in said second cooking chamber.

5. A machine as defined in claim 1, comprising:

a water reservoir;

fourth piping connected between said reservoir and said boiler and containing a pump;

sensor means for measuring the water level in said boiler; and control means activating said pump in response to the output of said sensor means for regulating the water level in said boiler.

6. A machine as defined in claim 5, comprising said third piping including a heat-transfer coil immersed in said reservoir.

7. A machine as defined in claim 1, wherein said first cooking chamber includes a cylindrical upper portion meeting a truncated conical lower portion that broadens toward said outlet in the lower end of said first cooking chamber.

8. A machine as defined in claim 1, wherein said first cooking chamber comprises a plurality of vertically aligned sequentially arranged sub-chambers.

* * * * *